United States Patent
Dietrich

(10) Patent No.: US 7,417,571 B2
(45) Date of Patent: Aug. 26, 2008

(54) METHOD FOR PROVIDING A CORRELATION

(75) Inventor: Manfred Dietrich, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/804,439

(22) Filed: May 17, 2007

(65) Prior Publication Data

US 2008/0001805 A1    Jan. 3, 2008

(30) Foreign Application Priority Data

May 17, 2006    (DE) .................... 10 2006 022 993

(51) Int. Cl.
*H03M 1/48* (2006.01)
(52) U.S. Cl. .................. 341/116; 341/117; 341/17; 341/35; 341/112; 318/700; 318/723
(58) Field of Classification Search ................ 341/112, 341/115–117, 11–17, 35, 92
See application file for complete search history.

(56) References Cited

U.S. PATENT DOCUMENTS

| | | | | | |
|---|---|---|---|---|---|
| 4,445,110 | A | * | 4/1984 | Breslow | 341/10 |
| 4,628,240 | A | * | 12/1986 | Kurakake et al. | 318/723 |
| 4,710,889 | A | * | 12/1987 | Wason | 702/94 |
| 5,162,798 | A | * | 11/1992 | Yundt | 341/116 |
| 6,320,524 | B1 | * | 11/2001 | Takehara | 341/116 |
| 6,754,610 | B2 | * | 6/2004 | Dudler et al. | 702/151 |
| 7,064,513 | B2 | * | 6/2006 | Fenley | 318/700 |
| 7,307,392 | B2 | * | 12/2007 | Kang et al. | 318/268 |
| 2004/0034483 | A1 | * | 2/2004 | Sonnichsen et al | 702/56 |

OTHER PUBLICATIONS

Don Alfano "Messwerterfassung über Sensoren" (title: Data measurement via sensors), May 2005, pp. 62-64, Electronic Information (English language abstract provided).

* cited by examiner

*Primary Examiner*—Linh V Nguyen
(74) *Attorney, Agent, or Firm*—Kenyon & Kenyon LLP

(57) ABSTRACT

A method for providing a correlation between a periodic analog/digital conversion and an angle-synchronous signal, in which the periodic analog/digital conversion is provided with a timing mark, which correlates with the angle-synchronous signal, and is assigned to an angular position of a device via this timing mark.

12 Claims, 1 Drawing Sheet

METHOD FOR PROVIDING A CORRELATION

FIELD OF THE INVENTION

The present invention relates to a method for providing a correlation, a system which has at least one unit for providing a correlation, a computer program, and a computer program product.

BACKGROUND INFORMATION

To improve the running behavior of an engine, it is useful to have information about a movement of a crankshaft of the engine, i.e., its instantaneous angular position and/or angular velocity. For this purpose, detecting and updating crankshaft-synchronous signals is known. Signals of this type are calculated in an angle-synchronous process known as the syn( ) process, or digitized by external triggering. However, in a periodic calculation and/or detection of signals of this type there is no correlation to a so-called "crankshaft clock" and thus an angle clock of the engine.

The detection of signals is described in the article "Messwerterfassung über Sensoren" [Detecting Measured Values via Sensors] by Don Alfano, Elektronik Informationen, Issue May 2005. This article points out, inter alia, that signals which are detected by a sensor are to be subjected to an analog/digital conversion for further processing. In this instance, a detection of sensor data requires more than a typical analog/digital converter, which is especially the case if linearization is required. Accordingly, an integrating converter having a corresponding analog front end is necessary for optimum operation.

SUMMARY OF THE INVENTION

In the method according to the present invention for providing a correlation between a periodic analog/digital conversion and an angle-synchronous signal, the periodic analog/digital conversion is provided with a timing mark, which correlates with the angle-synchronous signal, and is assigned to an angular position of a device by this timing mark.

The method is suitable in particular for devices which execute rotational movements. Devices of this type are typically used in vehicles. Using the method according to the present invention, it is therefore possible in one embodiment to determine a movement of a device designed as a crankshaft of an engine. In the event of a determination of a movement of this type, information about an angular position and/or an angular velocity of the device may be provided.

Using the method, a time correlation or angle correlation between the periodic analog/digital conversion and the angle-synchronous signal may be produced. This signal may be provided by an output stage or a so-called ECU, "electrical control unit" or an electronic control unit or a corresponding control device. The timing mark may be derived on the basis of a counter of a CAPCOM unit. This CAPCOM unit in one embodiment is a clock having a smallest unit of time, which is determined by a frequency at which a timer is clocked.

The system according to the present invention has at least one apparatus for providing a correlation between a periodic analog/digital conversion and an angle-synchronous signal. This at least one apparatus provides the periodic analog/digital conversion with a timing mark, which correlates with the angle-synchronous signal, and assigns it to an angular position of a device via this timing mark.

This system is implemented to perform all steps of the method according to the present invention. The at least one apparatus executes at least one step of the method. In its embodiment as the at least one apparatus, the system has an analog/digital converter for performing a periodic analog/digital conversion and an electronic unit for providing the timing mark. This electronic unit is implemented, for example, as a component of an output stage which cooperates with the device and provides the angle-synchronous signal. In one embodiment, it is also possible that the timing mark is provided by the electronic unit. The output stage may also be provided as a possible apparatus of the system.

Moreover, the present invention relates to a computer program having program code means for performing all steps of a method according to the present invention when the computer program is executed on a computer or a corresponding computing unit, in particular in an apparatus for a system according to the present invention.

Furthermore, the present invention relates to a computer program product having program code means which are stored on a computer-readable data carrier to perform all steps of a method according to the present invention when the computer program is executed on a computer or a corresponding computing unit, in particular in an apparatus for a system according to the present invention.

Using the present invention it is possible to evaluate for the angle-synchronous signal whether the analog/digital conversions periodically performed by the analog/digital converter lie in a predefined time interval in relation to a beginning of a cycle of the output stage signal. Times are typically considered in applications of the present invention, so that signal increase times, in particular time intervals between flanks of the signal and analog/digital conversions, may be considered. Alternatively, it is also conceivable that the analog/digital conversions lie in a predefined angular interval in relation to a beginning of a cycle of the output stage signal. This is possible in particular for an angle-synchronous output stage signal provided by the output stage as an apparatus of the system. Performing the method using the electronic unit, which may be implemented as a CAPCOM unit or "capture/compare" unit, is conceivable. CAPCOM units of this type are typically implemented for detecting and comparing data, signals, and the like.

The device typically rotates around an axis and assumes various angular positions in the course of time. The particular angular positions may be detected in particular by a sensor, which includes the output stage, or a sensor-like module, which cooperates with an output stage. The sensor or the sensor-like module provides at least one datum and/or signal on the basis of the detected angular position, from which the angle-synchronous signal is produced by the output stage.

In one embodiment of the present invention, it is therefore provided that every periodic analog/digital conversion which is triggered by an analog/digital converter, which is implemented in particular as an ERCOS-BIOS, is provided with the timing mark which is ascertained with the aid of the electronic unit. Every analog/digital conversion (ADC) may be assigned to an angular position via this timing mark. An assignment of this type may be performed in relation to a beginning of an activation cycle of the output stage. By including and thus taking into account a conversion rate of the periodic analog/digital conversion and thus the A/D converter (ADC unit, analog/digital converter), the method's precision is increased. Further improvement of the method is possible by including a number of a channel of the A/D converter which performs the analog/digital conversion.

To implement the present invention, it is conceivable to trigger periodic analog/digital conversions, in particular in an MED7, by a so-called "hook-in" of a conversion process into an object memory, which is designed, for example, as a 1-ms task container, of an operating system of the analog/digital converter, which is designed, for example, as an ERCOS-BIOS. Triggering this conversion process in this way causes the A/D converter to automatically fill a queue with 16 conversion results, for example. Each conversion result corresponds to a digitized analog voltage value. If each of these 16 conversions lasts 6 µs, the queue is thus filled after 16*6 µs=96 µs. Therefore, a point in time when the periodic analog/digital conversion is performed may be determined by taking into account the queue for data of the analog/digital converter consideration.

In one embodiment, it is provided that this A/D conversion process is appended directly following a further process, whose single object may be to detect a current count of a timer of the CAPCOM unit. A count ascertained in this way reflects a time of the A/D conversion while considering a filling rate of the queue by the conversion results. The time of performing the periodic analog/digital conversion is typically set in relation to a value of a counter for determining an angular position of the device. The timer or counter is accordingly set in relation to an angular position of the device of an engine implemented as a crankshaft, via a sensor, which is implemented as a tooth counter and therefore as a counter. Using the result provided in this way, the angular position of the crankshaft, at which a predetermined A/D channel of the A/D converter digitizes the angle-synchronous output signal of the output stage, is therefore also known.

DETAILED DESCRIPTION

Figure 1:
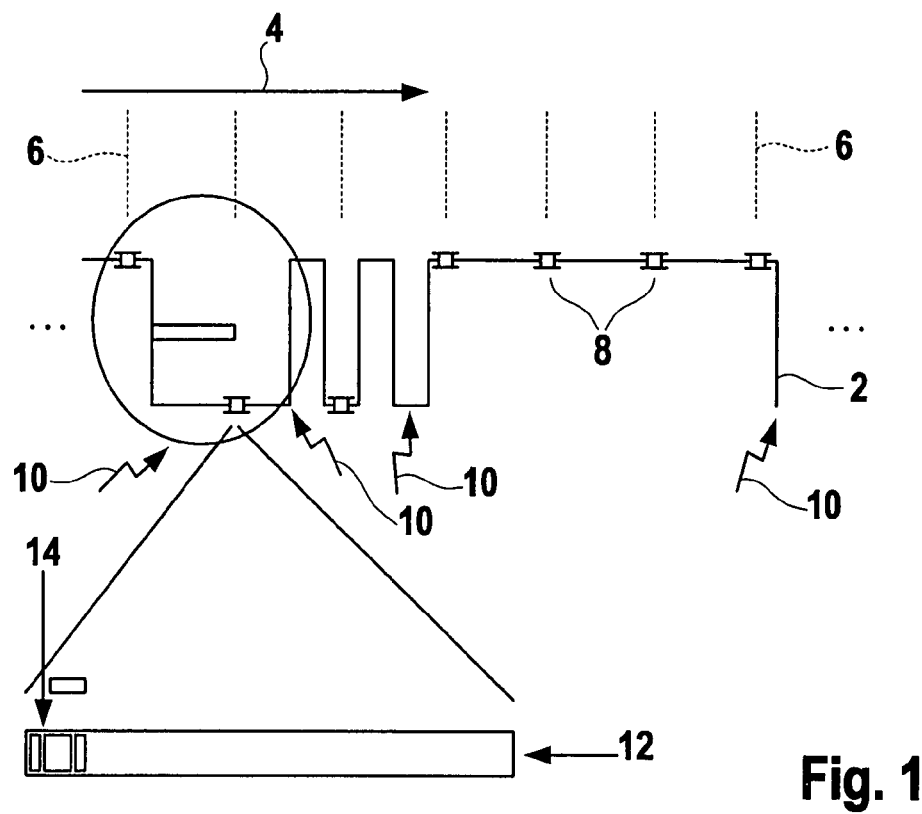
FIG. 1 schematically shows details of data processing in a specific embodiment of the method according to the present invention.

FIG. 1 schematically shows a curve 2 of an angle-synchronous signal, provided by an output stage, of a device implemented in the present embodiment as a crankshaft. Curve 2 has a square-wave structure and is plotted along a time axis 4. 1-ms tasks are delimited in this illustration by dashed lines 6.

It is provided that after each 1 ms in a 1-ms task, a periodic analog/digital conversion 8 is performed by an analog/digital converter. In addition, angle-synchronous timing marks 10, which are shown here as jagged arrows, are provided for the signal by an electronic unit, which is implemented for detecting and comparing (CAPCOM unit) signals and as a component of the output stage.

A queue 12 for conversion results of periodic analog/digital conversions 8 of a 1-ms task is schematically shown in the lower area of FIG. 1. This queue 12 is assigned to a channel 14 of the analog/digital converter which is used for diagnosing the signal of the output stage. In this specific embodiment, each analog/digital conversion 8 has a duration of 6 µs and queue 12 includes sixteen channels 14, so the queue is filled after 96 µs.

Figure 2:
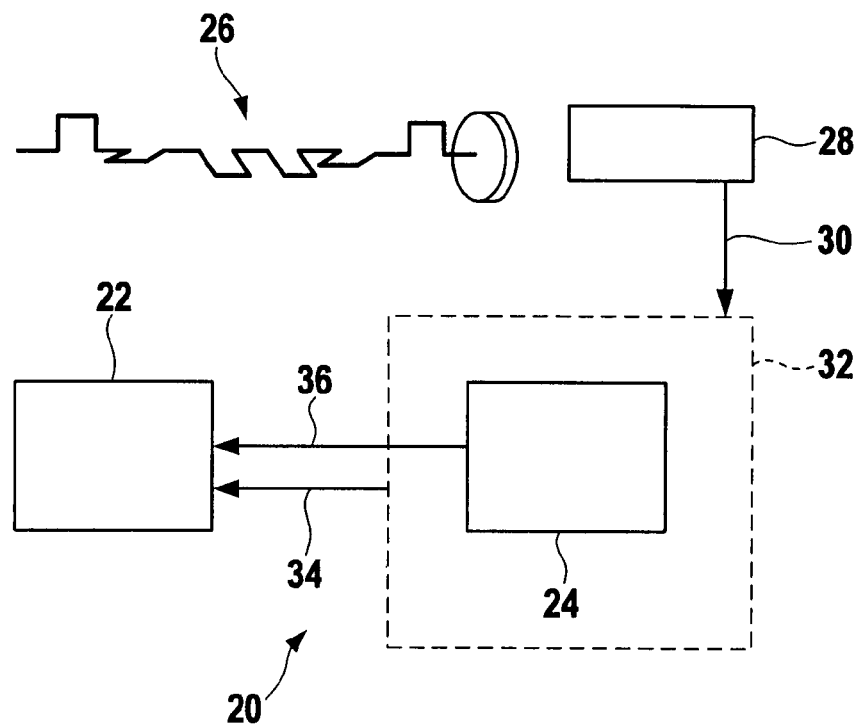
FIG. 2 schematically shows a specific embodiment of a system according to the present invention.

FIG. 2 schematically shows a specific embodiment of a system 20 according to the present invention, which includes an analog/digital converter as first apparatus 22 and an electronic unit as second apparatus 24 here. This electronic unit is implemented in the present embodiment as a CAPCOM unit, CAPCOM standing for "capture/compare". Second apparatus 24, which is implemented as an electronic unit, is thus implemented for detecting and comparing data and/or signals.

An angular position of a crankshaft 26 is detected using a sensor 28, which is implemented here as a tooth counter of crankshaft 26. Resulting data 30 of sensor 28 are supplied to an output stage 32 (dashed rectangle), which has second apparatus 24 implemented as an electronic unit as a component.

An angle-synchronous signal 34 is provided by output stage 32 on the basis of these data 30. A periodic analog/digital conversion of first apparatus 22, implemented as an analog/digital converter, is provided by the electronic unit and thus second apparatus 24 with a timing mark 36, which correlates with angle-synchronous signal 34, and is assigned to an angular position of the crankshaft using this timing mark 36. It is thus possible to provide a correlation between the periodic analog/digital conversion and angle-synchronous signal 36.

What is claimed is:

1. A method for providing a correlation between a periodic analog/digital conversion and an angle-synchronous signal, the method comprising:
providing the periodic analog/digital conversion with a timing mark, which correlates with the angle-synchronous signal; and
assigning the periodic analog/digital conversion to an angular position of a device via the timing mark.

2. The method according to claim 1, wherein a conversion rate at which the periodic analog/digital conversion is performed is taken into account.

3. The method according to claim 1, wherein the periodic analog/digital conversion is performed by an analog/digital converter, the angle-synchronous signal is provided by an output stage, which cooperates with the device, and the timing mark is provided by an electronic unit of the output stage.

4. The method according to claim 3, wherein a number of a channel of the analog/digital converter which performs the periodic analog/digital conversion is taken into account.

5. The method according to claim 3, further comprising determining a point in time of a performance of the periodic analog/digital conversion taking into account a queue for data of the analog/digital converter.

6. The method according to claim 5, wherein the point in time is related to a value of a counter for determining an angular position of the device.

7. The method according to claim 1, further comprising triggering the periodic analog/digital conversion by hooking a conversion process into an object memory of an operating system.

8. The method according to claim 1, wherein the method is used for determining an angular position of a device designed as a crankshaft.

9. A system comprising:
at least one apparatus for providing a correlation between a periodic analog/digital conversion and an angle-synchronous signal, the at least one apparatus providing the periodic analog/digital conversion with a timing mark, which correlates with the angle-synchronous signal, and assigning it to an angular position of a device via the timing mark.

10. The system according to claim 9, wherein the at least one apparatus includes an analog/digital converter for performing a periodic analog/digital conversion and an electronic unit for providing the timing mark.

11. The system according to claim 10, wherein the electronic unit includes a component of an output stage, which cooperates with the device and provides the angle-synchronous signal.

12. A computer-readable medium containing a computer program which when executed by a processor performs the following method for providing a correlation between a periodic analog/digital conversion and an angle-synchronous signal:

providing the periodic analog/digital conversion with a timing mark, which correlates with the angle-synchronous signal; and assigning the periodic analog/digital conversion to an angular position of a device via the timing mark.

\* \* \* \* \*